United States Patent [19]

Okumura et al.

[11] Patent Number: 5,068,281

[45] Date of Patent: Nov. 26, 1991

[54] PROCESS FOR THE PRODUCTION OF MOLDED ARTICLE OF FIBER-REINFORCED THERMOSETTING RESIN, AND MATERIALS THEREFOR

[75] Inventors: Hiroyuki Okumura, Hiratsuka; Masashi Kurokawa, Hatano; Akira Namikawa, Fujisawa; Hiroka Tanisake, Hiratsuka, all of Japan

[73] Assignees: Toyota Jidosha Kabushiki Kaisha, Aichi; A.G. International Chemical Company, Inc., Tokyo, both of Japan

[21] Appl. No.: 504,137

[22] Filed: Apr. 3, 1990

[30] Foreign Application Priority Data

Apr. 3, 1989 [JP] Japan .................. 1-81400

[51] Int. Cl.$^5$ ............................. C08L 75/04
[52] U.S. Cl. ........................... 524/753; 252/182.28; 264/328.1; 264/328.6; 264/328.8; 427/386; 528/73; 528/75
[58] Field of Search ............ 524/753; 252/182.28; 264/328.1, 328.6, 328.8; 427/386; 528/73, 75

[56] References Cited

U.S. PATENT DOCUMENTS 4,246,391  1/1981  Watson ..................... 528/75

*Primary Examiner*—Maurice J. Welsh
*Attorney, Agent, or Firm*—Wenderoth, Lind & Ponack

[57] ABSTRACT

A process for the production of a molded article of a thermosetting resin composition by injection of a raw material component mixture containing an active hydrogen compound (A) with a polymerizable vinyl monomer (B) and a raw material component containing a polyisocyanate compound (C) into a mold charged with a fiber (D), and a material which is a mixture of the active hydrogen compound (A) with the polymerizable vinyl monomer (B) or a combination of the mixture with the polyisocyanate compound (C).

20 Claims, No Drawings

PROCESS FOR THE PRODUCTION OF MOLDED ARTICLE OF FIBER-REINFORCED THERMOSETTING RESIN, AND MATERIALS THEREFOR

BACKGROUND OF THE INVENTION

1. Field of the Invention

This invention relates to a process for the production of a molded article of a fiber-reinforced thermosetting resin, and a material for producing a molded article of a fiber-reinforced thermosetting resin composition.

The present process can be used in fields requiring the molding of large-sized articles, e.g. in the fields of automobile industry, construction industry, etc. And, the present material for producing a molded article of a fiber-reinforced thermosetting resin composition has characteristics which can provide a short cure time and impart a molded article with excellent impact resistance.

2. Prior Art of the Invention

A molded article of a fiber-reinforced thermosetting resin composition has been hitherto produced by a method of hand lay-up molding, press molding, pultrusion, filament winding molding, resin transfer molding, or the like. In the molding of large-sized articles, the hand lay-up molding method has advantages in that its mold cost is low and requires no equipment investment. However, its molding cycle is long, and since glass mats are impregnated with resin by handwork, it is difficult to increase a glass content in the molded article in view of a spring-back problem of the glass mats. In the press molding, its molding cycle is short. However, a high pressure is required to press a sheet molding compound (SMC) and a bulk molding compound (BMC) which are so thickened that they can be molded. And, the larger the intended molded article is, the higher the investment for a pressing machine and a mold therefor is. Further, the pultrusion molding and the filament winding molding have a problem in that the shape of a molded article is considerably limited.

Of the above-described methods, the resin transfer molding is the most suitable to mold large-sized articles. Further, there is also a molding method called "Structural-RIM (S-RIM) molding", in which two reactive liquids are injected into and reacted in a mold, which is preliminarily charged with a reinforcing material, to achieve higher strength by using a RIM machine used in the field of urethane. This molding method is considered to come under the category of the resin transfer molding in a broad sense in view of the molding process thereof. The conventional resin transfer molding and the S-RIM are different from each other in an injection machine.

In the resin transfer molding, due to the use of a constant-pressure injection machine, the injection time varies depending upon a back pressure which is generated depending upon the filling degree of a glass fiber in the mold. Therefore, when the glass content is increased to obtain a molded article having high strength, the injection time is considerably long, although resins having a low reaction rate and a gel time changeable with an inhibitor and catalyst system, such as an ordinary unsaturated polyester resin, can be used without problem. In a resin system using a reaction between an unsaturated polyester resin and a polyisocyanate compound to obtain a molded article having higher strength and elastic modulus, however, its reaction having a high reaction rate is involved. Therefore, if the injection takes a long period of time, the reaction proceeds to cause a high increase in viscosity during the injection, and as a result, the injection cannot be continued any longer. In such a resin system, it is therefore necessary to complete the injection for a constant and short period of time without depending upon the degree of back pressure within the mold. Since a RIM machine is an injection machine having a constant injection rate (flow rate), it hardly causes a back pressure-induced change in the injection time and is suitable for a reaction system having a high reaction rate. Even in this machine, however, when resins are injected into a mold, which is highly charged with a glass fiber, at a high rate, a considerably high back pressure is generated and sometimes surpasses pump capability to stop the machine or liquid leakage sometimes occurs in a connection portion between a mixing head and a mold.

As described above, when a molded article having a high glass content for high strength is formed, both the resin transfer molding and the S-RIM involve a back pressure problem. That is, in order to complete the molding for a short period of time, it is necessary to reduce the back pressure thereby to make it possible to inject resins smoothly, completely and promptly after the resin injection, the reaction of the resins and the curing of the resultant molded article. For this purpose, it is essential to achieve low viscosity of the resins and to keep a low viscosity by controlling a reaction rate during the injection. However, there has been no resin that can meet such requirements.

SUMMARY OF THE INVENTION

It is an object of this invention to provide a molded article of a fiber-reinforced thermosetting resin composition suitable for a method of molding large-sized articles.

It is another object of this invention to provide a molded article of a fiber-reinforced thermosetting resin composition suitable for a reaction injection molding method.

It is further another object of this invention to provide a molded article of a fiber-reinforced thermosetting resin composition, produced by a resin transfer molding method.

It is still another object of this invention to provide a molded article of a fiber-reinforced thermosetting resin composition, produced by a structural-reaction injection molding method.

It is yet another object of this invention to provide a molded article of a fiber-reinforced thermosetting resin composition which permits the reaction of resins and the curing of the resultant molded article promptly after the injection of the resins by making it possible to achieve low viscosity of the resins and to keep a low viscosity by controlling a reaction rate during the injection.

It is still further another object of this invention to provide a thermosetting resin composition which can cure in a short period of time.

Further, it is another object of this invention to provide a combination of raw materials for producing a molded article of a thermosetting resin composition having excellent impact resistance.

According to this invention, there is provided a process for the production of a molded article of a thermosetting resin composition by injection of a raw material component mixture containing an active hydrogen compound (A) with a polymerizable vinyl monomer (B) and a raw material component containing a polyisocyanate compound (C) into a fiber (D) for a reaction injection molding, wherein (1) the active hydrogen compound (A) is formed by mixing an unsaturated polyester ($a_1$) produced from dicarboxylic acid containing 40 to 100 mole % of an unsaturated dicarboxylic acid or an anhydride thereof and a polyhydric alcohol containing a primary hydroxyl group and having a hydroxyl value of 110 to 280 mgKOH/g, preferably 150 to 250 mgKOH/g and an acid value of not more than 5 mgKOH/g with at least one member selected from the group consisting of an unsaturated epoxy ester ($a_2$) produced from an epoxy compound having at least one epoxy group in the molecule and an epoxy equivalent of 70 to 200, preferably 140 to 200 and a polymerizable unsaturated monobasic acid and an acrylic compound ($a_3$) having an acryloyl group and an hydroxyl group in the molecule, these ($a_1$), ($a_2$) and ($a_3$) have a mixing ratio satisfying the equation of $(a_2+a_3) / (a_1+a_2+a_3) \times 100 = 1$ to 15 wt %, preferably 5 to 10 wt %, (2) the polymerizable vinyl monomer (B) is a monomer containing 5 to 40% by weight, preferably 10 to 25% by weight, of methyl methacrylate, and (3) the polyisocyanate compound (C) is a liquid compound having a terminal group of

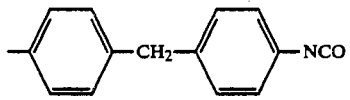

and a viscosity, at 25° C., of 10 to 2,000 cps, preferably of 30 to 1,500 cps, particularly preferably of 35 to 200 cps, the process being carried out under the following conditions (i), (ii) and (iii);

(i) (B) is 20 to 50% by weight, preferably 35 to 50% by weight, in amount based on the total amount of (A) and (B), (ii) (C) has an isocyanate group which is 0.75 to 1.2 times, preferably 0.85 to 1.1 times, by mole, the amount of the hydroxyl group of (A), and (iii) (D) is 30 to 75% by weight, preferably 30 to 60% by weight, based on the total amount of (A), (B), (C) and (D).

Further, according to this invention, there is provided a material for molding an article of a thermosetting resin composition, which is a mixture of the active hydrogen compound (A) with the polymerizable vinyl monomer (B) and satisfies the condition that the polymerizable vinyl monomer (B) is 20 to 50% by weight, preferably 35 to 50% by weight, in amount based on the total amount of the active hydrogen compound (A) and the polymerizable vinyl monomer (B).

Furthermore, according to this invention, there is provided a combined material for molding an article of a thermosetting resin composition, which is a combination of the mixture consisting of the active hydrogen compound (A) and the polymerizable vinyl monomer (B) with the polyisocyanate compound (C) and satisfies the conditions that the polymerizable vinyl monomer (B) is 20 to 50% by weight, preferably 35 to 50% by weight, in amount based on the total amount of the active hydrogen compound (A) and the polymerizable vinyl monomer (B) and that the polyisocyanate compound (C) has an isocyanate group which is 0.75 to 1.2 times, preferably 0.85 to 1.1 times, by mole, the amount of the hydroxyl group of (A).

The unsaturated polyester ($a_1$) means a polycondensate produced by carrying out, according to a known method, a dehydration-polycondensation reaction between a mixture, as an acid component, of 40 to 100 mole % of an unsaturated dicarboxylic acid or an anhydride thereof with not more than 60 mole % of a saturated dicarboxylic acid or an anhydride thereof and a polyhydric alcohol having a primary hydroxyl group as an alcohol component. The unsaturated polyester ($a_1$) used in the present composition has an acid value of not more than 5 mgKOH/g and a hydroxyl value of 110 to 280 mgKOH/g, preferably 150 to 250 mgKOH/g. When the unsaturated polyester has an acid value of over 5 mgKOH/g, the resultant fiber-reinforced molded article is liable to foam when molding and suffers a reduction in strength. The unsaturated polyester having a hydroxyl value of less than 110 mgKOH/g has a molecular weight of greater than 1,000 (according to a terminal group method), which results in reduction in impregnatability. The unsaturated polyester having a hydroxyl value of more than 280 mgKOH/g has a molecular weight of smaller than 500 (according to a terminal group method), which results in insufficient impact resistance, although the resultant impregnatability into a glass fiber, etc., is good.

Examples of the unsaturated dicarboxylic acid or an anhydride thereof are maleic acid, maleic anhydride, fumaric acid, and the like. Examples of the saturated dicarboxylic acid or an anhydride thereof are phthalic acid, phthalic anhydride, isophthalic acid, terephthalic acid, HET acid, tetrahydro-phthalic anhydride, and the like.

Examples of the polyhydric alcohol having a primary hydroxyl group are ethylene glycol, diethylene glycol, 1,4-butanediol, neopentyl glycol, and the like. Polyhydric alcohols having a secondary hydroxyl group such as propylene glycol, dipropylene glycol, an adduct of bisphenol A with propylene oxide, and the like may be used together in an amount, desirably, of not more than 5 mole %. When there is used an unsaturated polyester produced by using over 5 mole % of a polyhydric alcohol, all of the resultant molded articles exhibit low impact resistance. The unsaturated polyester ($a_1$) of this invention may contain an ordinary polymerization inhibitor such as hydroquinone, p-benzoquinone, methylhydroquinone, or the like.

The unsaturated epoxy ester ($a_2$) used in this invention is a product produced from an epoxy compound having at least one epoxy group in the molecule and an epoxy equivalent of 70 to 200, preferably 140 to 200 and a polymerizable unsaturated monobasic acid. Even when an unsaturated epoxy ester produced from a reaction between an epoxy compound having an epoxy equivalent of greater than 200 and a polymerizable unsaturated monobasic acid is used according to this invention, it is impossible to achieve a low viscosity of resins and to keep a low viscosity by controlling a reaction rate during the injection. Examples of the unsaturated epoxy ester ($a_2$) are vinyl ester resins obtained from bisphenol-type epoxy and novolak-type epxoy.

The acrylic compound ($a_3$) is a compound having an acryloyl group and a hydroxyl group in the molecule.

Examples of the acrylic compound are 2-hydroxyethyl (meth)acrylate, 2-hydroxypropyl (meth)acrylate, and the like.

The mixing ratio of these components satisfies the equation of $(a_2+a_3)/(a_1+a_2+a_3)\times 100 = 1$ to 15 wt %, preferably 5 to 10 wt %. When this mixing ratio exceeds 15 wt %, the viscosity increases steeply at an injection time, and it is difficult to take an injection time for molding large-sized articles.

Examples of the polymerizable vinyl monomer (B) which can be mixed with the above-described unsaturated polyester are styrene, chlorostyrene, vinyl toluene, (meth)acrylic acid, derivative of these, and the like.

When the active hydrogen compound (A) and the polymerizable vinyl monomer (B) are mixed with each other according to this invention, the amount of the active hydrogen compound (A) is in the range of from 50 to 80% by weight, preferably 50 to 65% by weight, and the amount of the polymerizable vinyl monomer (B) is in the range of from 20 to 50% by weight, preferably 35 to 50% by weight. When the amount of this component (A) exceeds 80% by weight, the resultant mixture has a high viscosity and the object of this invention cannot be attained. When the amount of the component (A) is less than 50% by weight, the resultant molded article is fragile, and cannot be used in fields requiring the molding of large-sized articles such as fields of automobile industry, construction industry, etc.

And, the polymerizable vinyl monomer (B) contains 5 to 40% by weight, preferably 10 to 25% by weight, of methyl methacrylate. When the methyl methacrylate proportion exceeds 40% by weight, the curing of the resultant molded article takes a longer time. And, when this proportion is less than 5% by weight, it is not as possible to achieve low viscosity of the resins and maintenance of a viscosity increase (initial viscosity), which is caused by a reaction during the injection, at a low level as intended by this invention.

The polyisocyanate compound (C) used in the composition of this invention is a liquid compound having a terminal group of

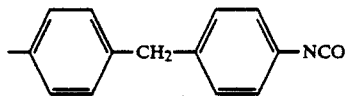

and a viscosity, at 25° C., of 10 to 2,000 cps, preferably 30 to 1,500 cps, more preferably 30 to 200 cps. That is, examples of the polyisocyanate compound (C) are a liquid diphenylmethane diisocyanate (e.g. supplied by Dow Mitsubishi Kasei Co., Ltd., under the tradename of "Isonate 134L"), a polyether prepolymer of diphenylmethane-4,4'-diisocyanate (e.g. supplied by Dow Mitsubishi Kasei Co., Ltd., under the tradename of "Isonate 181"), a polyester prepolymer of diphenylmethane-4,4'-diisocyanate (e.g. supplied by Dow Mitsubishi Kasei Co., Ltd., under the tradename of "Isonate 240"), and the like. The amount of the polyisocyanate compound (C) is limited to the range in which the amount of its isocyanate group is 0.75 to 1.20 times, preferably 0.85 to 1.1 times, by mole, as large as the amount of the hydroxyl group of the active hydrogen compound (A). When the amount of the isocyanate group is less than 0.75 times, by mole, the amount of the above hydroxyl group or more than 1.20 times, by mole, the amount of the above hydroxyl group, the resultant molded article is fragile and cannot be used in fields requiring the molding of large-sized articles such as fields of automobile industry, construction industry, etc.

Preferred examples of the fiber (D) are a glass fiber, carbon fiber, aramid fiber, etc., in view of strength, affinity with the resins, price, etc., and glass fiber is particularly preferable.

The present resins are used in the following mode, whereby a molded article of a fiber-reinforced thermosetting resin composition can be obtained. The polyol side of a RIM machine is charged with the active hydrogen compound (A) and the polymerizable vinyl monomer (B) into which an ordinary cure promotor such as dimethyl aniline, cobalt naphthenate, or the like and an ordinary urethanating catalyst such as cobalt octenate, di-n-butyltin dilaurate, or the like are added. And, the isocyanate side of the RIM machine is charged with the polyisocyanate compound (C) into which an ordinary curing catalyst having no active hydrogen, such as t-butyl perbenzoate, t-butyl peroctoate, benzoyl peroxide, or the like, is added. Further, the fiber (D) is preliminarily charged into a mold, and then, the above two liquid resins are injected into the mold, while being uniformly mixed, by using the above RIM machine, whereby a urethanation reaction and radical reaction are effected nearly simultaneously, and a molded article of a fiber-reinforced thermosetting resin composition can be obtained.

Useful as a resin for a resin transfer molding is a thermosetting resin composition prepared by mixing the active hydrogen compound (A) with the polymerizable vinyl monomer (B) in which the amount of the polymerizable vinyl monomer (B) is 20 to 50% by weight, preferably 35 to 50% by weight, based on the total amount of the active hydrogen compound (A) and the polymerizable vinyl monomer (B), or a combination of a mixture consisting of the active hydrogen compound (A) and the polymerizable vinyl monomer (B) with the polyisocyanate compound (C) in which the amount of the polymerizable vinyl monomer (B) is 20 to 50% by weight, preferably 35 to 50% by weight, based on the total amount of the active hydrogen compound (A) and the polymerizable vinyl monomer (B) and the isocyanate group amount of the said compound (C) is 0.75 to 1.2 times, preferably 0.85 to 1.1 times, by mole, the amount of the hydroxyl group of the active hydrogen compound (A). That is because these resins exhibit a low viscosity. The resin composition prepared by mixing the active hydrogen compound (A) with the polymerizable vinyl monomer (B) has a characteristic in that molding time is short. The combination of the mixture consisting of the active hydrogen compound (A) and the polymerizable vinyl monomer (B) with the polyisocyanate compound (C) has a characteristic in that the resultant molded article has excellent impact resistance.

The components (A), (B), (C) and (D) specified in this invention are mixed in the specified ratio, whereby the viscosity of the resultant mixture is low, the initial thickening is comparatively moderate, and it is possible to effect a reaction in which the curing is completed for a short period of time. Therefore, a large-sided molded article of a fiber-reinforced thermosetting resin composition can be obtained.

EXAMPLES

The following Examples will illustrate this invention more in detail. However, this invention shall not be limited to these Examples.

SYNTHESIS EXAMPLE 1

Synthesis of unsaturated polyester and preparation of unsaturated polyester resin (α):

A reactor having a stirrer, a thermometer, a nitrogen-introducing tube and a partial refluxer with a thermometer on its colum portion was charged with 1,034 g of isophthalic acid, 1,687 g of neopentyl glycol and 1,006 g of ethylene glycol. While a nitrogen gas was flowed, the mixture was heated up to 200° C. to carry out a dehydration-condensation reaction according to a customary method. In the partial refluxer, steam having a temperature of 100° C. was flowed, and the glycols were refluxed to distil condensation water off from the reactor system.

When the acid value of the resultant reaction mixture became 4.5 mgKOH/g, the heating was stopped, and the reaction mixture was cooled to 120° C. Then, 2,169 g of fumaric acid was added. The resultant mixture was again heated to carry out a dehydration-condensation reaction with taking care that the reaction temperature did not exceed 220° C., whereby 5,000 g of an unsaturated polyester having an acid value of 4.5 mgKOH/g and a hydroxyl value of 151.6 mgKOH/g was obtained. Then, the unsaturated polyester was cooled to 170° C., and 1.5 g of hydroquinone was added and fully mixed.

Part of the unsaturated polyester was dissolved in styrene to give an unsaturated polyester resin (α) having 35% of styrene.

SYNTHESIS EXAMPLE 2

Synthesis of unsaturated polyester and preparation of unsaturated polyester resin (β):

The same reactor as that used in Synthesis Example 1 was charged with 989 g of isophthalic acid, 1,751 g of neopentyl glycol, 1,044 g of ethylene glycol and 2,073 g of fumaric acid, and the mixture was reacted in the same way as in Synthesis Example 1 to synthesize an unsaturated polyester, had an acid value of 2.3 mgKOH/g and a hydroxyl value of 232.3 mgKOH.g. The unsaturated polyester was dissolved in styrene to give an unsaturated polyester resin (β) having 35% of styrene.

SYNTHESIS EXAMPLE 3

Synthesis of unsaturated epoxy ester resin (γ):

A three-necked flask having a refluxer was charged with 700 g of a novolak-type epoxy resin (DEN 438, supplied by Dow Chemical, epoxy equivalent =179), 340 g of methacrylic acid, 693 g of styrene, 2.08 g of triethylamine and 0.4 g of hydroquinone, and, while the mixture was stirred, it was heated up to 120° C. to allow it to react until its acid value became 15 mgKOH/g, whereby an unsaturated epoxy ester resin (γ) was obtained.

Table 1 shows physical properties of the above unsaturated polyester resins (α) and (β) and the above unsaturated epoxy ester resin (γ).

EXAMPLE 1

Di-n-butyltin dilaurate (10 g) as a urethanation catalyst and 80 g of 6% cobalt naphthenate as a radical reaction promotor were added to a mixture consisting of 8.5 kg of the unsaturated polyester resin (α) prepared in Synthesis example 1, 0.5 kg of the unsaturated epoxy ester prepared in Synthesis Example 3 and 1.0 kg of methyl methacrylate. The resultant mixture was charged into the A side raw material tank of a RIM machine. 200 g of t-butyl peroctoate as a radical reaction catalyst was added to 10 kg of ISONATE 143 (supplied by Dow Mitsubishi Kasei Co., Ltd., 4,4-diphenylmethane diisocyanate, NCO equivalent=143) as a polyisocyanate component, and the resultant mixture was charged into the B side raw material tank of the RIM machine. The A side/B side material mixing ratio was calculated such that the amount of the isocyanate group in the B side tank was 0.93 times, by mole, as large as the amount of the hydroxyl group in the A side tank, and it was found that the A side/B side ratio was 4.275 (g/g). The injection rates (flow rates) of the A side and B side were adjusted to meet this ratio. Then, the RIM machine conditioned as above was operated to inject the material resins into a poly cup for 1 second, and 2 cc of the injected mixture liquid was measured for a viscosity change by using a rheometer (RM-1, supplied by Shimadzu Corporation). The time when the injection was finished was taken as 0 time. The measurement showed a viscosity of 25 cps after 10 seconds and a vsicosity of 100 cps after 60 seconds. This resin composition had a very low viscosity for 60 seconds from the very initial time.

Then, a mold, which had a cavity size of 400×500×3 (mm) and a fan gate in one of short sides of its rectangular form and was so made to allow a resin to overflow the other short side when the resin was injected, was heated to 60° C., and charged with a continuous strand mat. The mold was closed and positioned perpendicularly, and the above-prepared RIM machine was operated to inject the resins through the lower portion of the mold until the resins overflowed the mold top portion. Then, the mold was closed and left to stand for 2 minutes, and the mold was then opened and removed to give a molded article of the fiber-reinforced thermosetting resin composition. That is, molded articles having a glass content of 42 wt %, 56 wt % or 69 wt % were prepared. These molded articles all showed that the resin impregnatability into the glass fiber was excellent and the resin impregnation was perfect.

EXAMPLES 2 to 4

Example 1 was repeated except that the kind and amount of the components for the active hydrogen compound (A) in the A side tank, the methyl methacrylate amount, the styrene amount and the A side/B side mixing ratio were changed as shown in Table 2. And, the viscosity change in mixed resins and the glass content and moldability were evaluated. Table shows the results together with the results of the molded article of Example 1.

COMPARATIVE EXAMPLES 1 to 7

Example 1 was repeated except that the kind and amount of the components for the active hydrogen compound (A) in the A side tank, the methyl methacrylate amount and the A side/B side mixing ratio were changed as shown in Table 3 or 4. And, the viscosity change in mixed resins and the glass conent and moldability were evaluated. Tables 3 and 4 show the results. In all of Comparative Examples 1 to 7, the resins after mixed showed a steep viscosity increase, and when the glass content exceeded 56 wt %, the resins exhibited a very high back pressure and leaked through a connection portion between the mixing head of the RIM machine and the mold. Thus, it was impossible to obtain a completely filled, molded article.

COMPARATIVE EXAMPLE 8

Example 1 was repeated except that the kind and amount of the components for the active hydrogen compound (A), the methyl methacrylate amount and the A side/B side mixing ratio were changed as shown in Table 4. And, the viscosity change in mixed resins and the glass content and moldability were evaluated. Tables 4 show the results. The resin composition showed a low increase in viscosity during the period of 60 seconds after the resins were mixed, and could be completely filled up to a glass content of 69 wt %. However, while the time required from the injection to removal of the mold was as short as 246 seconds in Example 1, the time required in this Comparative Example 8 was as long as 398 seconds. Thus, it was impossible to obtain a resin combination exhibiting a short cure time that is an object of this invention.

TABLE 1

| RESIN SYNTHESIS EXAMPLE | ($\alpha$) | | ($\beta$) | | ($\gamma$) | |
|---|---|---|---|---|---|---|
| Synthesis Example | 1 | | 2 | | 3 | |
| Composition | Isophthalic acid | 1,034 g | Isophthalic acid | 989 g | DEN438*[1] | 700 g |
| | Fumaric acid | 2,169 g | Fumaric acid | 2,073 g | Methacrylic acid | 340 g |
| | Ethylene glycol | 1,006 g | Ethylene glycol | 1,044 g | Styrene | 693 g |
| | Neopentyl glycol | 1,687 g | Neopentyl glycol | 1,751 g | Triethyl-amine | 2.08 g |
| | | | | | Hydroquinone | 0.40 g |
| Analysis | | | | | | |
| Acid value (mgKOH/g) | 4.5 | | 2.3 | | 15.0 | |
| Hydroxyl value (mgKOH/g) | 151.6 | | 232.3 | | 127.0 | |
| DILUTION | | | | | | |
| Styrene amount (g) | 2,000 | | 2,000 | | — | |
| Styrene content (wt %) | 35.0 | | 35.0 | | 40.0 | |
| ANALYSIS | | | | | | |
| Acid value (mgKOH.g) | 2.9 | | 1.5 | | 15.0 | |
| Hydroxyl value (mgKOH/g) | 98.5 | | 151.0 | | 127.0 | |

Note:
*[1]Novolak-type epoxy resin, epoxy equivalent 179, supplied by Dow Chemical

TABLE 2

| | | EXAMPLE | | | |
|---|---|---|---|---|---|
| | | 1 | 2 | 3 | 4 |
| COMPOSITION | | | | | |
| Unsaturated polyester resin ($a_1$) + SM (part of (B)) | Kind | $\alpha$ | $\alpha$ | $\beta$ | $\beta$ |
| | Amount (part) | 85.0 | 82.5 | 85.0 | 83.1 |
| Unsaturated epoxy ester ($a_2$) + SM (part of (B)) | Kind | $\gamma$ | $\gamma$ | $\gamma$ | — |
| | Amount (part) | 5.0 | 5.0 | 5.0 | — |
| Acrylic compound having a hydroxyl group | Kind | — | 2-HEMA | — | 2-HEMA |
| | Amount | — | 2.5 | — | 5.0 |
| SM (part of (B)) | Amount (part) | — | — | — | 6.9 |
| MMA (part of (B)) | Amount (part) | 10.0 | 10.0 | 10.0 | 5.0 |
| Polyisocyanate compound (C) | Kind*[1] | 143L | 143L | 143L | 143L |
| | Amount*[2] (part) | 21.6 | 23.7 | 33.1 | 37.1 |
| MIXING RATIO IN RIM MACHINE (A SIDE/B SIDE) | | 4.275 | 3.926 | 2.875 | 2.581 |
| ANALYSIS | | | | | |
| [($a_2$) + ($a_3$)]/[($a_1$) + ($a_2$) + ($a_3$)] × 100 (wt %) | | 5.15 | 9.30 | 5.15 | 8.47 |
| (B)/[($a_1$) + ($a_2$) + ($a_3$) + (B)] × 100 (wt %) | | 41.8 | 40.9 | 41.8 | 41.0 |
| Methyl methacrylate/(B) × 100 (wt %) | | 24.0 | 24.5 | 24.0 | 12.2 |
| NCO group of polyisocyanate compound (C)/OH group of [($a_1$) + ($a_2$) + ($a_3$)] (by mole) | | 0.93 | 0.93 | 0.95 | 1.00 |
| VISCOSITY | | | | | |
| 10 seconds after mixed (cps) | | 25 | 25 | 25 | 20 |
| 60 seconds after mixed (cps) | | 100 | 85 | 84 | 50 |
| MOLDABILITY EVALUATION | | | | | |
| Glass fiber (D)*[3] | Glass content 42 wt % | ○*[4] | ○ | ○ | ○ |
| | Glass content 56 wt % | ○ | ○ | ○ | ○ |
| | Glass content 69 wt % | ○ | ○ | ○ | ○ |
| Molding time (sec) | | 246 | 241 | 293 | 295 |

Notes:
Abbreviations:
$\alpha$, $\beta$ and $\gamma$: see Table 1;
2-HEMA: 2-hydroxyethyl methacrylate;
SM: styrene;
MMA: methyl methacrylate
*[1]143L = ISONATE 143L (supplied by MD Chemical Co., Ltd., viscosity 30 cps at 25° C., NCO equivalent 143)
*[2]Part based on 100 parts of ($a_1$) + ($a_2$) + ($a_3$) + ($a_4$)
*[3]Continuous strand mat
*[4]Moldability evaluation:
○: completely filled;
△: incompletely filled due to leakage during injection but filled up to not less than 50%;
X: incompletely filled due to leakage during injection and not filled up to 50%.

TABLE 3

| | | COMPARATIVE EXAMPLE | | | |
|---|---|---|---|---|---|
| | | 1 | 2 | 3 | 4 |
| COMPOSITION | | | | | |
| Unsaturated polyester | Kind | α | β | α | β |
| resin ($a_1$) + SM (part of (B)) | Amount (part) | 100.0 | 100.0 | 95.0 | 95.0 |
| Unsaturated epoxy | Kind | | | γ | |
| ester ($a_2$) + SM (part of (B)) | Amount (part) | — | — | 5.0 | — |
| Acrylic compound having | Kind | | | | 2-HEMA |
| a hydroxyl group | Amount | — | — | — | 5.0 |
| SM (part of (B)) | Amount (part) | — | — | — | — |
| MMA (part of (B)) | Amount (part) | 0.0 | 0.0 | 0.0 | 0.0 |
| Polyisocyanate | Kind[*1] | 143L | 143L | 143L | 143L |
| compound (C) | Amount[*2] (part) | 25.4 | 39.0 | 24.1 | 38.7 |
| MIXING RATIO IN RIM MACHINE (A SIDE/B SIDE) | | 3.682 | 2.461 | 3.866 | 2.479 |
| ANALYSIS | | | | | |
| [($a_2$) + ($a_3$)]/[($a_1$) + ($a_2$) + ($a_3$)] × 100 (wt %) | | 0.0 | 0.0 | 4.63 | 7.49 |
| (B)/[($a_1$) + ($a_2$) + ($a_3$) + (B)] × 100 (wt %) | | 35.0 | 35.0 | 35.2 | 33.3 |
| Methyl methacrylate/(B) × 100 (wt %) | | 0.0 | 0.0 | 0.0 | 0.0 |
| NCO group of polyisocyanate compound (C)/ OH group of [($a_1$) + ($a_2$) + ($a_3$)] (by mole) | | 1.00 | 1.00 | 0.96 | 1.00 |
| VISCOSITY | | | | | |
| 10 seconds after mixed (cps) | | 50 | 56 | 59 | 56 |
| 60 seconds after mixed (cps) | | 590 | 420 | 353 | 1,350 |
| MOLDABILITY EVALUATION | | | | | |
| Glass fiber (D)[*3] | Glass content 42 wt % | ◯[*4] | ◯ | ◯ | ◯ |
| | Glass content 56 wt % | Δ | Δ | Δ | X |
| | Glass content 69 wt % | X | X | X | X |
| Cure time (sec) | | 265 | 305 | 205 | 253 |

Notes:
Abbreviations:
α, β and γ: see Table 1;
2-HEMA: 2-hydroxyethyl methacrylate;
SM: styrene;
MMA: methyl methacrylate
[*1]143L = ISONATE 143L (supplied by MD Chemical Co., Ltd., viscosity 30 cps at 25° C., NCO equivalent 143)
[*2]Part based on 100 parts of ($a_1$) + ($a_2$) + ($a_3$) + ($a_4$)
[*3]Continuous strand mat
[*4]Moldability evaluation:
◯: completely filled;
Δ: incompletely filled due to leakage during injection but filled up to not less than 50%;
X: incompletely filled due to leakage during injection and not filled up to 50%.

TABLE 4

| | | COMPARATIVE EXAMPLE | | | |
|---|---|---|---|---|---|
| | | 5 | 6 | 7 | 8 |
| COMPOSITION | | | | | |
| Unsaturated polyester | Kind | α | β | α | β |
| resin ($a_1$) + SM (part of (B)) | Amount (part) | 95.0 | 95.0 | 75.0 | 75.0 |
| Unsaturated epoxy | Kind | | | γ | γ |
| ester ($a_2$) + SM (part of (B)) | Amount (part) | — | — | 10.0 | 5.0 |
| Acrylic compound having | Kind | | | 2-HEMA | |
| a hydroxyl group ($a_3$) | Amount | — | — | 5.0 | — |
| SM (part of (B)) | Amount (part) | — | — | — | — |
| MMA (part of (B)) | Amount (part) | 5.0 | 5.0 | 10.0 | 20.0 |
| Polyisocyanate | Kind[*1] | 143L | 143L | 143L | 143L |
| compound (C) | Amount[*2] (part) | 24.1 | 37.0 | 24.3 | 18.8 |
| MIXING RATIO IN RIM MACHINE (A SIDE/B SIDE) | | 3.866 | 2.587 | 3.565 | 4.425 |
| ANALYSIS | | | | | |
| [($a_2$) + ($a_3$)]/[($a_1$) + ($a_2$) + ($a_3$)] × 100 (wt %) | | 0.0 | 0.0 | 18.4 | 5.8 |
| (B)/[($a_1$) + ($a_2$) + ($a_3$) + (B)] × 100 (wt %) | | 38.3 | 38.3 | 40.3 | 48.3 |
| Methyl methacrylate/(B) × 100 (wt %) | | 13.1 | 13.1 | 24.8 | 41.5 |
| NCO group of polyisocyanate compound (C)/ OH group of [($a_1$) + ($a_2$) + ($a_3$)] (by mole) | | 1.00 | 1.00 | 0.88 | 0.92 |
| VISCOSITY | | | | | |
| 10 seconds after mixed (cps) | | 42 | 47 | 21 | 12 |
| 60 seconds after mixed (cps) | | 277 | 260 | 840 | 64 |
| MOLDABILITY EVALUATION | | | | | |
| Glass fiber (D)[*3] | Glass content 42 wt % | ◯[*4] | ◯ | ◯ | ◯ |
| | Glass content 56 wt % | Δ | Δ | Δ | ◯ |
| | Glass content 69 wt % | X | X | X | ◯ |

TABLE 4-continued

|  | COMPARATIVE EXAMPLE | | | |
|---|---|---|---|---|
|  | 5 | 6 | 7 | 8 |
| Cure time (sec) | 301 | 336 | 227 | 398 |

Notes:
Abbreviations:
α, β and γ: see Table 1;
2-HEMA: 2-hydroxyethyl methacrylate;
SM: styrene;
MMA: methyl methacrylate
*¹143L = ISONATE 143L (supplied by MD Chemical Co., Ltd., viscosity 30 cps at 25° C., NCO equivalent 143)
*²Part based on 100 parts of (a₁) + (a₂) + (a₃) + (a₄)
*³Continuous strand mat
*⁴Moldability evaluation:
○: completely filled;
Δ: incompletely filled due to leakage during injection but filled up to not less than 50%;
X: incompletely filled due to leakage during injection and not filled up to 50%.

What is claimed is:

1. A process for the production of a molded article of a thermosetting resin composition by injection of a raw material component mixture containing an active hydrogen compound (A) with a polymerizable vinyl monomer (B) and a raw material component containing a polyisocyanate compound (C) into a mold charged with a fiber (D), wherein:
    (1) the active hydrogen compound (A) is formed by mixing an unsaturated polyester (a₁) produced from a dicarboxylic acid containing 40 to 100 mole % of an unsaturated dicarboxylic acid or an anhydride thereof and a polyhydric alcohol containing a primary hydroxyl group and having a hydroxyl value of 110 to 280 mgKOH/g and an acid value of not more than 5 mgKOH/g with at least one member selected from the group consisting of an unsaturated epoxy ester (a₂) produced from an epoxy compound having at least one epoxy group in the molecule and an epoxy equivalent of 70 to 200 and a polymerizable unsaturated monobasic acid and an acrylic compound (a₃) having an acryloyl group and an hydroxyl group in the molecule, and (a₁), (a₂) and (a₃) have a mixing ratio satisfying the equation of $$(a_2+a_3) / (a_1+a_2+a_3) \times 100 = 1 \text{ to } 15 \text{ wt \%},$$

(2) the polymerizable vinyl monomer (B) is a monomer containing 5 to 40% by weight of methyl methacrylate, and
    (3) the polyisocyanate compound (C) is a liquid compound having a terminal group of

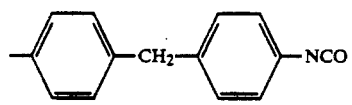

and a viscosity, at 25° C., of 10 to 2,000 cps, the process being carried out under the following conditions (i), (ii) and (iii);
(i) (B) is 20 to 50% by weight in amount based on the total amount of (A) and (B),
(ii) (C) has an isocyanate group which is 0.75 to 1.2 times, preferably 0.85 to 1.1 times, by mole, the amount of the hydroxyl group of (A), and
(iii) (D) is 30 to 75% by weight based on the total amount of (A), (B), (C) and (D).

2. A process according to claim 1, wherein the unsaturated dicarboxylic acid or the anhydride thereof is at least one member selected from the group consisting of maleic acid, maleic anhydride and fumaric acid.

3. A process according to claim 1, wherein the dicarboxylic acid is at least one member selected from the group consisting of phthalic acid, phthalic anhydride, isophthalic acid, terephthalic acid, Het acid and tetrahydrophthalic anhydride.

4. A process according to claim 1, wherein the polyhydric alcohol having a primary hydroxyl group is at least one member selected from the group consisting of ethylene glycol, diethylene glycol, 1,4-butanediol and neopentyl glycol.

5. A process according to claim 1, wherein the unsaturated epoxy ester (a₂) is a product produced by a reaction between an epoxy compound having at least one epoxy group in the molecule and a polymerizable unsaturated monobasic acid.

6. A process according to claim 1, wherein the acrylic compound (a₃) is 2-hydroxyethyl (meth)acrylate or 2-hydroxypropyl (meth)acrylate or a mixture of these.

7. A process according to claim 1, wherein the polymerizable vinyl monomer (B) comprises 5 to 40% by weight of methyl methacrylate and at least one member selected from the group consisting of styrene, chlorostyrene, vinyl toluene, (meth)acrylic acid, ethyl (meth)acrylate, propyl (meth)acrylate and butyl (meth)acrylate.

8. A process according to claim 1, wherein the polyisocyanate compound (C) is at least one member selected from the group consisting of liquid diphenylmethane diisocyanate, a polyether prepolymer of diphenylmethane-4,4'-diisocyanate and a polyester prepolymer of diphenylmethane-4,4'-diisocyanate.

9. A process according to claim 1, wherein the fiber (D) is at least one member selected from the group consisting of a glass fiber, a carbon fiber and an aramid fiber.

10. A process according to claim 1, wherein the unsaturated polyester has a hydroxyl value of 150 to 250 mgKOH/g.

11. A process according to claim 1, wherein the unsaturated epoxy ester (a₂) is a product produced by a reaction between an epoxy compound having at least one epoxy group in the molecule and an epoxy equivalent of 140 to 200 and a polymerizable monobasic acid.

12. A process according to claim 1, wherein the polyisocyanate compound (C) has a viscosity, at 25° C., of 30 to 1,500 cps.

13. A process according to claim 1, wherein the polyisocyanate compound (C) has a viscosity, at 25° C., of 30 to 200 cps.

14. A process according to claim 1, wherein the polyisocyanate compound (C) has an isocyanate group which is 0.85 to 1.1 times, by mole, the amount of the hydroxyl group of the active hydrogen compound (A).

15. A process according to claim 1, wherein the polymerizable vinyl monomer (B) is 30 to 50% by weight in amount based on the total amount of the active hydrogen compound (A) and the polymerizable vinyl monomer (B).

16. A process according to claim 1, wherein the fiber (D) is 30 to 60% by weight in amount based on the total amount of the active hydrogen compound (A), the polymerizable vinyl monomer (B), the polyisocyanate compound (C) and the fiber (D).

17. A material for molding an article of a thermosetting resin composition, which is a mixture of an active hydrogen compound (A) which is formed by mixing an unsaturated polyester ($a_1$) produced from a dicarboxylic acid containing 40 to 100 mole % of an unsaturated dicarboxylic acid or an anhydride thereof and a polyhydric alcohol containing a primary hydroxyl group and having a hydroxyl value of 110 to 280 mgKOH/g and an acid value of not more than 5 mgKOH/g with at least one member selected from the group consisting of an unsaturated epoxy ester ($a_2$) produced from an epoxy compound having at least one epoxy group in the molecule and an epoxy equivalent of 70 to 200 and a polymerizable unsaturated monobasic acid and an acrylic compound ($a_3$) having an acryloyl group and an hydroxyl group in the molecule, wherein ($a_1$), ($a_2$) and ($a_3$) have a mixing ratio satisfying the equation of $$(a_2+a_3) / (a_1+a_2+a_3) \times 100 = 1 \text{ to } 15 \text{ wt \%},$$

with a polymerizable vinyl monomer (B) containing at least 5 to 40% by weight of methyl methacrylate;

the mixture satisfying the condition that the polymerizable vinyl monomer (B) is 20 to 50% by weight in amount based on the total amount of the active hydrogen compound (A) and the polymerizable vinyl monomer (B).

18. A material according to claim 17, which is used to form an article of a fiber-reinforced thermosetting resin composition.

19. A combined material for molding an article of a thermosetting resin composition, which is combination of a mixture consisting of an active hydrogen compound (A) which is formed by mixing an unsaturated polyester ($a_1$) produced from a dicarboxylic acid containing 40 to 100 mole % of an unsaturated dicarboxylic acid or an anhydride and a polyhydric alcohol containing a primary hydroxyl group and having a hydroxyl value of 110 to 280 mgKOH/g and an acid value of not more than 5 mgKOH/g with at least one member selected from the group consisting of an unsaturated epoxy ester ($a_2$) produced from an epoxy compound having at least one epoxy group in the molecule and an epoxy equivalent of 70 to 200 and a polymerizable unsaturated monobasic acid and an acrylic compound ($a_3$) having an acryloyl group and an hydroxyl group in the molecule, wherein ($a_1$), ($a_2$) and ($a_3$) have a mixing ratio satisfying the equation of $$(a_2+a_3) / (a_1+a_2+a_3) \times 100 = 1 \text{ to } 15 \text{ wt \%},$$

and a polymerizable vinyl monomer (B) containing at least 5 to 40% by weight of methyl methacrylate with a polyisocyanate compound (C) having a viscosity, at 25° C., of 10 to 2,000 cps;

the combination satisfying the conditions that the polymerizable vinyl monomer (B) is 20 to 50% by weight in amount based on the total amount of the active hydrogen compound (A) and the polymerizable vinyl monomer (B) and that the polyisocyanate compound (C) has an isocyanate group which is 0.75 to 1.2 times, by mole, the amount of the hydroxyl group of (A).

20. A combined material according to claim 19, which is used to form an article of a fiber-reinforced thermosetting resin composition.

* * * * *